US012590521B2

(12) United States Patent
Hunter et al.

(10) Patent No.: US 12,590,521 B2
(45) Date of Patent: Mar. 31, 2026

(54) IN SITU EQUIPMENT CAPABILITY ASSESSMENT AND USE IN OPERATION

(71) Applicant: Halliburton Energy Services, Inc., Houston, TX (US)

(72) Inventors: Timothy Holiman Hunter, Duncan, OK (US); Stanley V. Stephenson, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 602 days.

(21) Appl. No.: 17/289,147

(22) PCT Filed: Dec. 21, 2018

(86) PCT No.: PCT/US2018/067086
§ 371 (c)(1),
(2) Date: Apr. 27, 2021

(87) PCT Pub. No.: WO2020/131100
PCT Pub. Date: Jun. 25, 2020

(65) Prior Publication Data
US 2021/0388703 A1    Dec. 16, 2021

(51) Int. Cl.
*E21B 43/26* (2006.01)
*G05D 7/06* (2006.01)

(52) U.S. Cl.
CPC .......... *E21B 43/26* (2013.01); *E21B 43/2607* (2020.05); *G05D 7/0682* (2013.01); *E21B 2200/20* (2020.05)

(58) Field of Classification Search
CPC .... E21B 43/2607; E21B 2200/20; E21B 7/00; G05D 7/0682
See application file for complete search history.

(56) References Cited

U.S. PATENT DOCUMENTS

| | | | |
|---|---|---|---|
| 6,954,713 B2 | 10/2005 | Eryurek | |
| 8,214,308 B2 | 7/2012 | Chu | |
| 8,647,957 B2 | 2/2014 | Borowik et al. | |
| 9,410,394 B2 * | 8/2016 | Lecerf | C09K 8/516 |
| 9,638,194 B2 | 5/2017 | Wiegman et al. | |
| 9,659,254 B2 | 5/2017 | Achin et al. | |
| 9,846,855 B2 | 12/2017 | Rogers et al. | |
| 10,151,178 B2 * | 12/2018 | Stephenson | E21B 44/00 |
| 10,408,028 B2 * | 9/2019 | Stephenson | E21B 41/00 |

(Continued)

FOREIGN PATENT DOCUMENTS

| | | | |
|---|---|---|---|
| WO | 2017106865 | 6/2017 | |
| WO | WO-2017106865 A1 * | 6/2017 | E21B 43/12 |

OTHER PUBLICATIONS

ISRWO International Search Report and Written Opinion for PCT/US2018/067086 dated Sep. 20, 2019.

*Primary Examiner* — Nicole Coy
*Assistant Examiner* — Nicholas D Wlodarski
(74) *Attorney, Agent, or Firm* — John Wustenberg; C. Tumey Law Group PLLC

(57) ABSTRACT

A method of fracturing may comprise: varying a plurality of operational parameters of wellbore servicing equipment; observing a response of the wellbore servicing equipment; generating a model of the wellbore servicing equipment based on the response; and changing at least one of the plurality of operational parameters based at least in part on the model.

18 Claims, 2 Drawing Sheets

(56) References Cited

U.S. PATENT DOCUMENTS

| | | | |
|---|---|---|---|
| 2012/0166096 A1* | 6/2012 | Stephenson | G07C 5/008 |
| | | | 700/275 |
| 2013/0175030 A1* | 7/2013 | Ige | G05B 15/02 |
| | | | 700/282 |
| 2016/0326860 A1 | 11/2016 | Hunter | |
| 2017/0130712 A1 | 5/2017 | Zhang et al. | |
| 2017/0226998 A1* | 8/2017 | Zhang | F04B 17/03 |
| 2022/0003229 A1* | 1/2022 | Mu | F04B 17/06 |

* cited by examiner

IN SITU EQUIPMENT CAPABILITY ASSESSMENT AND USE IN OPERATION

BACKGROUND

A wellbore servicing operation may comprise the drilling of a wellbore into a subterranean formation, a drilling fluid, also referred to as a drilling mud, may be continuously circulated from the surface down to the bottom of the wellbore being drilled and back to the surface again. Drilling muds may be prepared at the surface using preparation equipment and circulated using pumps. Among other functions, the drilling fluid may serve to transport wellbore cuttings up to the surface, cool the drill bit, and provide hydrostatic pressure on the walls of the drilled wellbore.

Another wellbore servicing operation may comprise a cementing operation. During cementing operations such as well construction and remedial cementing, cement compositions are commonly utilized. Cement compositions may be used in primary cementing operations whereby pipe strings, such as casing and liners, are cemented in wellbores. In a typical primary cementing operation, a cement composition may be mixed using mixing equipment and pumped using pumping equipment into an annulus between the exterior surface of the pipe string disposed therein and the walls of the wellbore (or a larger conduit in the wellbore). The cement composition may set in the annular space, thereby forming an annular sheath of hardened, substantially impermeable material (i.e., a cement sheath) that may support and position the pipe string in the wellbore and may bond the exterior surface of the pipe string to the wellbore walls (or the larger conduit). Among other things, the cement sheath surrounding the pipe string should function to prevent the migration of fluids in the annulus, as well as protect the pipe string from corrosion. Cement compositions also may be used in remedial cementing methods, such as in squeeze cementing for sealing voids in a pipe string, cement sheath, gravel pack, subterranean formation, and the like. Cement compositions may also be used in surface applications, for example, construction cementing.

Another wellbore servicing operation may comprise fracturing. Fracturing treatments are commonly used in subterranean operations, among other purposes, to stimulate the production of desired fluids (e.g., oil, ins, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

Wellbore servicing equipment failures may occur during performance of a wellbore servicing operation. Such equipment failures may result in a variety of problems including, among other things, causing inconvenient time delays in performing the wellbore servicing operation, unexpected and/or undesirable timing and expense of equipment repairs, and/or damage to the wellbore and the associated subterranean formation being treated in the wellbore servicing operation. Further, since the wellbore servicing equipment may fail while being used for a wellbore servicing operation, it is not uncommon to mobilize more equipment than needed for the treatment to ensure sufficient equipment is available if there are any wellbore servicing equipment failures during the treatment. In some cases, all mobilized pumping equipment may be used at relatively lower loads, but if some pumping equipment fails, the loads on at least some of the remaining pumping equipment may be increased. In other cases, some of the pumping equipment may be left offline until needed due to a failure of other pumping equipment. While mobilizing additional wellbore servicing equipment to a particular wellbore servicing operation may provide relief when some equipment fails, current systems and methods of selecting equipment may lead to provisioning too little or too much equipment for a wellbore servicing operation. Providing too much or too little for a wellbore servicing operation may result in increased cost of the wellbore servicing operation and/or a misappropriation of equipment such that the additional equipment is not well utilized. Additionally, each piece of wellbore servicing equipment may have different operational limits depending on many factors such as age of equipment, position within a rig up of equipment, availability and supply parameters of fluids, among many other factors. Oftentimes a piece of wellbore servicing equipment is not optimally rigged up to perform at its peak performance.

BRIEF DESCRIPTION OF THE DRAWINGS

These drawings illustrate certain aspects of the present disclosure, and should not be used to limit or define the disclosure.

DETAILED DESCRIPTION

Figure 1:
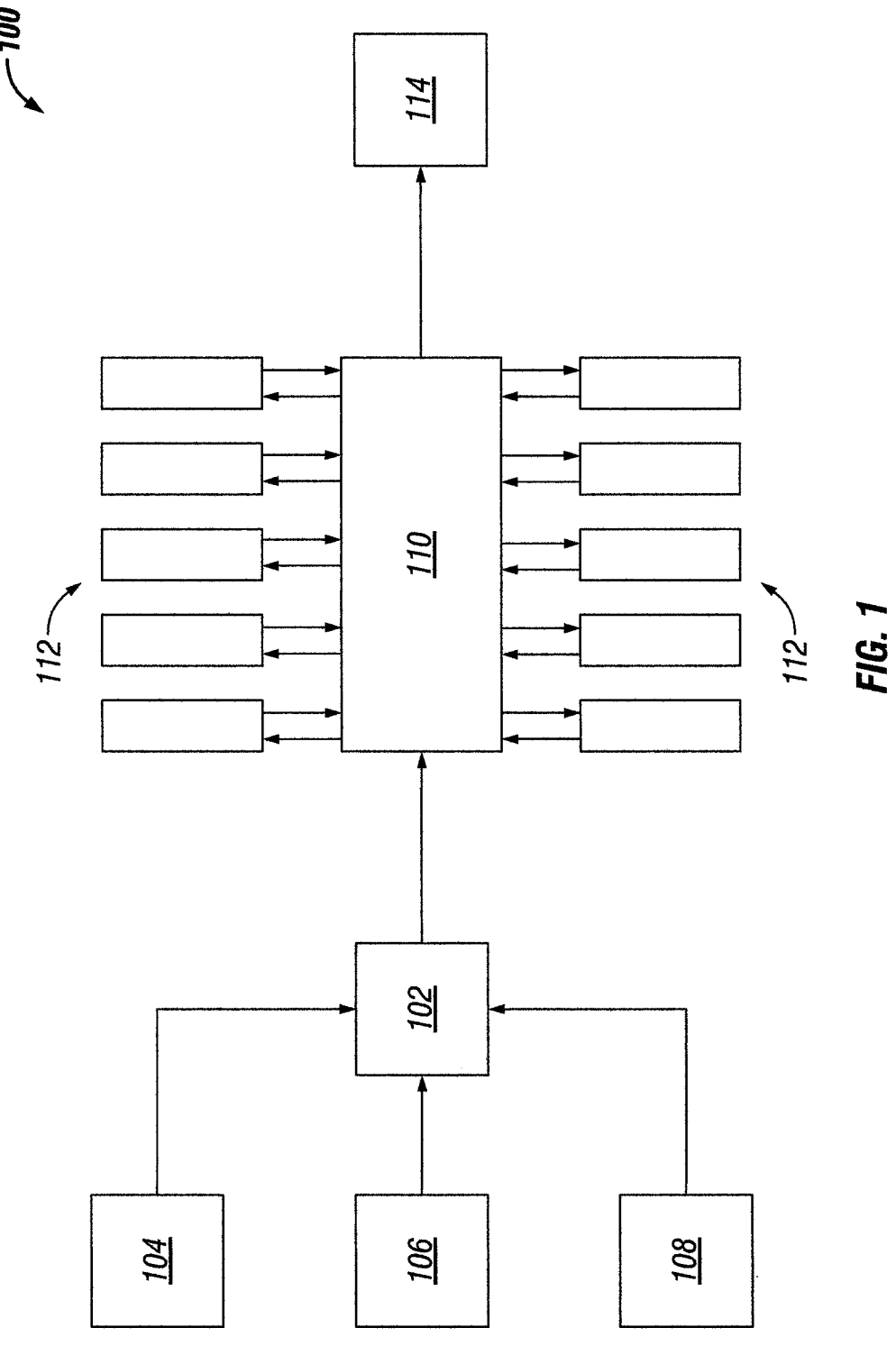
FIG. 1 is a schematic illustration of a rig up for a hydraulic fracturing operation.

Selection of wellbore servicing equipment for a wellbore servicing operation may be an important component of achieving successful and profitable results in the wellbore servicing industry. In particular, selection of the proper amount and/or number of a particular type of wellbore servicing equipment may be important to enable conformance to a required performance during a wellbore servicing operation. For example, in a hydraulic fracturing operation, pumps may pressurize a fluid comprising proppant and water to a high pressure and transport the fluid into a subterranean formation whereby the high pressure fluid fractures the rock in the subterranean formation. The proppant in the fluid may enter the created fractures and "prop" open the fractures when the pressure from the fluid is brought below the closing pressure of the formation.

The hydraulic horsepower requirement to fracture a subterranean formation may be directly related to the pressure and flow rate required to create, propagate, and sustain one or more fractures in the subterranean formation. Typically, the pressure and flow rate, and by extension the hydraulic horsepower, necessary to fracture a subterranean formation is greater than what a single pump may be able to provide. As such, in most hydraulic fracturing operations multiple pumps are placed side by side and fluidically connected to a common manifold. The manifold may provide the pumps with a conduit for low pressure input and a conduit for high pressure output. In addition to pumps, other equipment such as blenders may be present at a fracturing operation. Blenders may mix water, proppant, and chemicals to create the fracturing fluid that will be pumped by the fracturing pumps. Blenders may also provide "boost" or pressure increase to the low pressure input side of the manifold to ensure that the fracturing pumps are supplied with adequate fluid to prevent cavitation.

Selection of the proper number of a particular type of wellbore servicing equipment may be important to enable conformance to a required performance during a wellbore servicing operation. As discussed a subterranean formation may require a certain hydraulic horsepower to be sustained throughout the fracturing treatment so there must be at least a minimum number of pumps available to provide the hydraulic horsepower. However, it may be impractical to run pumps at full hydraulic horsepower capacity for the duration of the treatment so an operator may choose to provide an excess number of pumps in order to reduce the duty on each pump, for example. Additional pumps may be provided as backup which may be idled until necessary for use. The backup pumps may also be used if one of the other pumps fail. Also, additional blenders may be provided as backup or to increase the overall blending capacity of the fracturing operation.

Further, once one or more pieces of equipment have been selected for a wellbore servicing operation, it will be appreciated that field conditions, such as wellsite topology, may dictate that what may have initially been a prudent equipment selection is no longer suitable, thereby requiring more and/or different pieces equipment. Operational capability of each piece of equipment may also be a consideration when selecting the equipment required for a particular fracturing operation. Operational capability may be the capability of a particular piece of equipment to operate once the rig up is complete and the equipment is ready to begin the fracturing operation. Operational capability may be contrasted with conditional capability. Conditional capability may refer to the performance of a particular piece of equipment given its condition without regards to its rig up and position within the hydraulic fracturing site. Conditional capability may be related to parameters such as how old or new a particular piece of equipment is, the service history of a particular piece of equipment, previous performance, remaining life estimates, among others well known in the art. Conditional capability may answer questions such as, in isolation, how many hours can a pump be driven at maximum hydraulic horsepower load before the pump is expected to encounter a condition where the pump must be brought offline for repair. However, conditional capability does not take into account the actual rig up of the pump and operational capability of the pump may be much less, or much more, depending on the particular rig up of the pump. As such, the conditional capability of a piece of equipment may be assessed prior to each unit being dispatched to a wellbore servicing location. In contrast, operational capability of each piece of equipment at the wellbore servicing location may be a function of how each unit is arranged and connected at the wellbore servicing location. Operational capability may therefore be much more difficult to predict as there may be a large number of permutations of arrangements, or order, of equipment selected to be brought to a wellbore servicing location as well as a large number of types of rig ups. Therefore, the operational capability of a particular piece of equipment may not be easily predicted ahead of time as it may be largely dependent upon the physical location of the equipment at the wellbore servicing location. Modeling a particular arrangement and rig up of equipment may not replicate all contributing conditions that determine the operational capability of a particular piece of equipment. As such, there is a need to develop a method to assess the operational capability of each piece of equipment in situ as it related to the physical arrangement and connections after all equipment is connected and operational.

FIG. 1 is a schematic illustration of a rig up 100 for a hydraulic fracturing operation. FIG. 1 illustrates only one particular embodiment of one particular rig up. As one of ordinary skill in the art will appreciate, there may be many other physical configurations of equipment, including equipment not illustrated in FIG. 1. As illustrated in FIG. 1, blender 102 may be connected to water source 104, proppant source 106, and chemical source 108. Blender 120 may include a blender tub capable of mixing the fracturing fluid to be pumped by fracturing pumps 112. Blender 120 may include equipment for blending and adding water, proppant, and chemicals to the blender tub, including, but not limited to, sand screws, liquid additive pump, dry additive equipment, centrifugal pumps, and other equipment well known in the art. Blender 120 may also provide the required volumetric flow rate of fracturing fluid at the required pressure for a particular fracturing stage. Although only one blender is illustrated in FIG. 1, one of ordinary skill in the art will appreciate that two or more blenders may be used in particular embodiments. Blender 120 may be fluidically coupled to manifold 110 to provide the fracturing fluid to the low pressure side of manifold 110. Manifold 110 may include a low pressure side and a high pressure side (not illustrated). An inlet of fracturing pumps 112 may be fluidically coupled to the low pressure side of manifold 110. Fracturing pumps 112 may suction the fracturing fluid from the low pressure side of manifold 110 as illustrated by the arrow connecting fracturing pumps 112 to manifold 110. Pumps 112 may pressurize the fracturing fluid to the required treatment pressure and expel the pressurized fracturing fluid into the high pressure side of manifold 110. The high pressure side of manifold 110 may be fluidically coupled to wellbore 114. Wellbore 114 may include a conduit penetrating a subterranean formation that may allow the pressurized fracturing fluid to contact the subterranean formation.

One parameter that may affect operational capability may be the ambient air temperature that a pump experiences at the wellbore servicing location. As discussed above, pumps may be positioned side by side at a wellbore servicing location for maximum space efficiency and for connection to a manifold. The ambient air temperature around a pump may be a function of the far field temperature as well as the temperature rise cause by the positioning of the pump at a wellbore servicing location. As one of ordinary skill in the art would understand, a pump positioned between two other pumps may experience a higher ambient temperature and therefore be operating at a higher temperature than a pump at the end of a line of pumps. The pumps used in hydraulic fracturing a typically trailer mounted positive displacement reciprocating plunger pump powered by an internal combustion engine connected to a transmission. The transmission may have a drive shaft connected to a power end of the pump wherein the power end may transform the rotation of the driveshaft into reciprocating motion required for operating the fluid end of the pump. The fluid end of the pump may include plungers and valves whereby the plungers are reciprocated by the power end of the pump. The internal combustion engine and transmission operating between two other pumps will likely have higher operating temperatures than an engine and transmission operating to either of the middle pump.

During the fracturing operation, the middle pump may become heat soaked from being surrounded by pumps to either side due to a higher ambient temperature experience by the middle pump. Heat soaked pumps will generally perform worse and have a higher rate of failure than pumps which are not heat soaked. As one of ordinary skill in the art will appreciate, the engine controls may try to control engine operation to maximize efficiency, deliver the requested horsepower, and keep the engine operating in a safe condition so that engine damage does not occur. Heat output from the engines operating at a wellbore servicing location may increase the ambient temperature which may lower the air density around a pump. The lower air density may contain less oxygen which may cause the engine controls to cut fuel to avoid burning too rich of a mixture. Additionally, lower air density may cause the engine controls may also retard engine timing to avoid a detonation or lean running condition. In either condition, the result may be that the engine controls effectively lower the horsepower output of the engine to compensate for operating conditions. The reduced horsepower output may lead to reduced hydraulic horsepower output by the pump leading to less volumetric flow rate and pressure output.

Additionally, higher ambient temperatures may make the radiators connected to the engine perform worse as the temperature gradient between the ambient air and the engine coolant decreases. In some pumps, the radiator fan speed is a direct function of engine RPM. As the ambient temperature rises, the rate of heat transfer from the radiator may decrease causing head to build up in the engine. The engine controls may detect an increase in coolant temperature and may compensate by decreasing engine RPM thereby reducing the heat output of the engine which may also cause the radiator fan speed to drop, further reducing heat transfer out of the pump. The reduced RPM will may lead to a lower volumetric flow rate from the pump. Furthermore, heat retention by the coolant may cause other engine fluid such as engine oil to heat up. The hotter oil may decrease in viscosity leading to more engine wear. In extreme cases, hot oil may begin to break down causing a permanent loss in viscosity and lubrication ability. Either condition of engine oil may wear on the engine and pump and potential pre-mature failure of the pump components.

Heat soak may also affect the performance of the transmission. The transmission provides speed and torque conversion to from the engine driveshaft to the power end of the pump. Transmissions may be a critical component of the pump as the transmission converts the relatively higher RPM and lower torque of the engine crankshaft to a relatively lower RPM and higher torque required by the power end of the pump. Transmissions often rely on transmission fluid to cool and lubricate the transmission components. Pumps typically have a separate radiator for the transmission fluid to exchange heat with the ambient air. Transmissions components may become heat soaked and increase in temperature when inadequate amounts of heat are removed from the transmission fluid. Much like the engine controls, transmission controls may operate to keep the transmission operating in an efficient, safe, and non-damaging manner. If the transmission controls detect that the transmission fluid temperature rises, the controls may make adjustments to the operation of the transmission, such as changing the gear the transmission is in to compensate. The change in gearing may be accompanied by a reduction in RPM by the engine controller to compensate for the lower gearing. As discussed above, the horsepower output of the engine may be reduced thereby leading to a reduction in hydraulic horsepower applied to a treatment fluid the pump is pressurizing. Much like engine oil, transmission fluid may become damaged if exposed to high heat and thereafter lose its viscosity and lubrication properties. As such heat soak in transmissions may be a concern to operators.

For at least the foregoing reasons, during the hydraulic fracturing operation, the maximum horsepower available from a particular pump may be a function of ambient temperature. To determine the maximum horsepower output of a particular pump during the hydraulic fracturing treatment, a pump may be run up to maximum horsepower output while the pumps surrounding the pump to be tested are also run up to maximum horsepower. Since pumps to one side of the manifold are more impacted by those pumps on the same side, a subsequent decrease in load, or horsepower, may be applied to pumps on the other side of the manifold to keep the treatment rate constant. Treatment rate may refer to the pressure and flow rate of the treatment fluid, such as a fracturing fluid, from the manifold into the wellbore. In general, the treatment rate is an engineered parameter based on seismological data and computer models, among other parameters. The treatment rate is may be dictated by a pump schedule whereby the treatment rate is a predetermined value for each stage of the hydraulic fracturing treatment. Using the methods herein, the deviation in treatment rate may be controlled within a specified amount such that the pump schedule is adhered to. In some examples, the deviation from the pump schedule may be less than about 10%. Alternatively, the deviation from the pump schedule may be less than about 5%, less than about 3%, or less than about 1%. The pumps that are run up to maximum horsepower may be kept at maximum horsepower such that the ambient air temperature around the pumps is increased. Performance of the pump to be tested may be monitored throughout over a period of time to observe how the increased ambient temperature affects the horsepower output of the pump. In the instance where the pump to be tested is at the end of the manifold, the pump at the end of the manifold and the pump adjacent to it on the same side of the manifold may be run up to maximum horsepower. It may be observed that as the ambient temperature around a pump increases, the pump performance decreases. The performance of the pump may be recorded by a computer system and stored in an operational database. Some data points that may be stored may include ambient temperature, engine oil temperature, engine coolant temperature, transmission fluid temperature, transmission gear, RPM, horsepower output, pump flow rate, pump pressure, and other performance factors of the pump. The data points may be used later to determine the maximum horsepower at a particular temperature the pump can reliably output in the particular rig up configuration.

Figure 2:
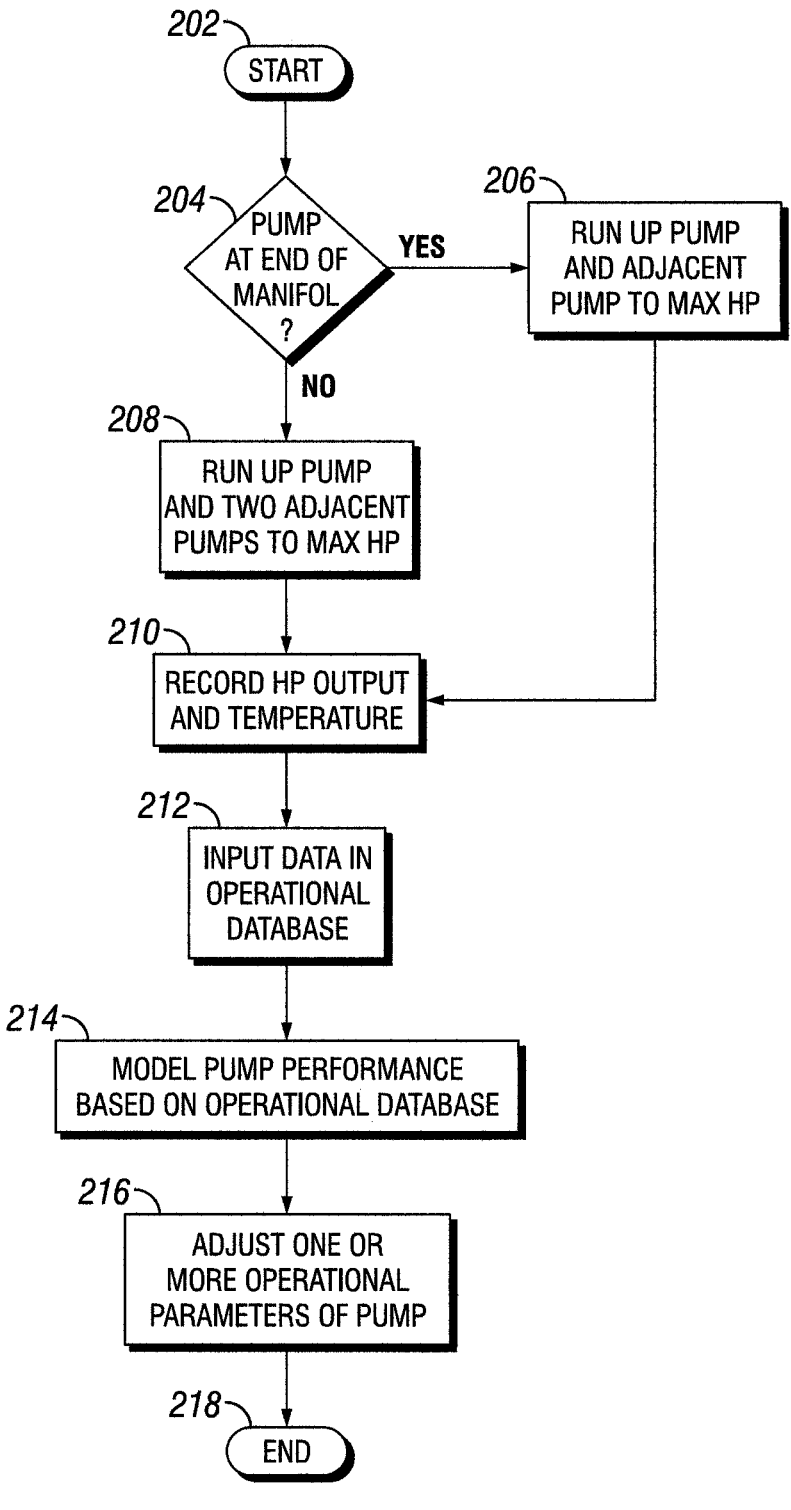
FIG. 2 illustrates a flow chart for determining the maximum horsepower a pump may output for a particular rig up.

FIG. 2 illustrates a method 200 for determining the maximum horsepower a pump may output for a particular rig up. Method 200 may begin at bubble 202. In decision block 204, the determination of which pumps on a manifold to run to maximum horsepower is determined. As discussed above, the pumps positioned on the end of a manifold generally are not surrounded by other pumps to either side so to test the maximum horsepower output of a pump positioned at the end of a manifold, the pump at the end of the manifold and the adjacent pump to it may be run up to maximum horsepower as shown in block 206. In the instance where the pump is not at the end of the manifold, the pump and two adjacent pumps may be run up to maximum horsepower as shown in block 208. For each of block 206 and block 208, pumps on the opposite side of the manifold may be throttled down such that the treatment rate remains relatively constant. At block 210, the horsepower output and temperature may be monitored and recoded, for example by sensors and control software, which may then be entered into an operational database as shown in block 212. The parameters recorded in the operational database may be any of the parameters previously discussed and others well known in the art. At block 214 the pump performance may be modeled based at least in part on the data in the operational database. The model may predict factors such as the maximum horsepower the pump may output given a particular ambient temperature, for example. Alternatively, the model may predict horsepower output based on other performance factors tabulated in the operational database. At block 216 one or more operational parameters of the pump may be adjusted, based at least in part on the output of the model, to maximize horsepower output of the pump at a particular ambient temperature, for example. Additionally, in block 214 the performance of the transmission may be modeled based on the operational parameters. The operation of the transmission may be adjusted based at least in part on the model.

Another parameter that may affect operational capability may the availability of a fluid to pump. Availability may refer to multiple parameters including fluid flow rate and pressure to sustain the flow rate requirement of the pump. As discussed above, most pumps used in hydraulic fracturing are plunger driven fixed displacement pumps and therefore a full rotation of the pump displaces a fixed volume of fluid. As such the volumetric flow rate of the pump is proportional to the RPM the pump is driven at. When a pump is not provided with adequate volumetric rate of fluid to pump, cavitation may occur. For example, if a pump displaces 100 gallons per minute at a particular RPM, there must be at least 100 gallons per minute of flow to the pump or cavitation may occur. Pumps may be starved of flow for many different reasons only some of which may be discussed herein. In one instance, the blender may not be providing adequate flow-rate to sustain the demand from the operator on the pumps. The pumps may be running at an RPM that is too high, and by extension at too great of a flow rate, for the blender or blenders to support. Another condition where a pump does not receive adequate inlet flow may be where a pump is positioned on a manifold furthest from the blender. Each of the pumps upstream of the end pump may be suctioning the inlet flow before the fluid can reach the end pump thereby leading to a starvation condition. Pumps may also be starved of inlet flow by rig up conditions such as hoses and conduits that are too long that drop too much pressure or hoses and conduits that are too small and can't deliver the requested flow rate.

Another parameter that may affect operational capability may be related to the operating nature of reciprocating pumps. As one of ordinary skill in the art will appreciate, the reciprocating nature of a positive displacement plunger-pump will cause a pulsing flow on both the inlet and the outlet of the pump. For some examples of reciprocating plunger pumps, a connecting rod may connect the plunger to a crankshaft in the power end of the pump. As such, the plunger velocity versus crank angle of a reciprocating plunger pump may be a function of interactions between the connecting rod and crankshaft. As most connecting rods are relatively short, the interaction between the crankshaft and connecting rod tend to produce highly distorted sinusoidal flow curves. The distorted flow curves may have several effects on pump flow including higher than predicted peak flow rates and associated pressure drop due to high flow rates affecting net positive suction head and possibly induc-ing cavitation. The distorted sinusoid may begin to stack on top of one another when multiple pumps on the same manifold in close proximity are operated. When the sinuso-ids of pumps overlap, "beats" or areas of constructive interference may occur. When sinusoids overlap on an inlet stroke, for example, the total inlet flow rate required to sustain a non-cavitation condition in the pump may exceed what is possible by the particular rig up. As such, the total inlet flow required to sustain the pump at the particular RPM may not be satisfied and cavitation may occur. Similarly, when sinusoids overlap on the power or outlet stroke, large pressure spikes may occur in the pumping equipment which may lead to equipment damage or loss of pressure contain-ment.

One method to determine operational capability of a pump relating to availability of fluid may be to select one or more pumps and vary the flow rate of each pump while keeping the total treatment volume fixed as previously discussed. The pump or pumps may be ramped up and down through a maximum flow rate to observe cavitation tenden-cies and tendencies to form beats in the inlet and outlet flows of the pumps. Again, the pumps on one side of a manifold may be more affected by pumps on the same side of the manifold. As such, the flow rates of the pumps on the opposite side of the manifold from the pump or pumps being tested may be ramped up or down such that the treatment rate remains relatively constant. The data points collected may include but are not limited to RPM of pumps, flow rate, cavitation tendencies, beat tendencies, and other parameters well known in the art. The data points may be collected and stored in an operational database as previously described. The operational database, and the data therein, may be used to form a model that may predict flow behavior of the pump. The model may be used to adjust one or more operating parameters of the pump, for example. One operating param-eter of interest may be the rate available from a particular pump. During a hydraulic fracturing operation additional treatment rate may be required over the planned rate accord-ing to the pump schedule. The model may be used to determine which pumps can handle the additional rate. In another application, if a pump has a mechanical failure or stops functioning properly, the model may be used to assess which pumps the rate may be redistributed to. In another example, the model may be used to evaluate stand-by equipment that is not currently participating in the pumping of the hydraulic fracturing fluid.

Another parameter that may affect operational capability may be related to the manifold and discharge lines. The manifold and discharge lines may have a natural frequency or frequencies that the equipment may vibrate or oscillate at. Frequency and location of where oscillations may occur may be a function of pump type, flow rate, discharge pressure, and fluid density, for example. Much like beats may cause pressure spikes and equipment damage, mechanical oscilla-tions within the manifold and discharge lines may cause damage equipment damage.

One method to determine operational capability of a manifold and discharge lines may be to select one or more pumps and vary the flow rate, discharge pressure, and fluid density of the fracturing fluid. The pump or pumps may be ramped up and down through a minimum flow rate through a maximum flow rate as well and minimum pressure to maximum pressure to observe mechanical resonances in the equipment. The blender may be operated to provide a variable density fluid by adding more or less proppant to the fracturing fluid. The operational parameters of pumps on either side of a manifold may be varied such that mechanical resonances may be induced. The data points collected may include but are not limited to RPM of pumps, flow rate, flow rate, density and other parameters well known in the art. The data points may be collected and stored in an operational database as previously described. The operational database, and the data therein, may be used to form a model that may predict mechanical resonance behavior of the discharge lines and manifold for the particular rig up. The model may then be used to adjust one or more operating parameters of the pumps and blender to avoid conditions that excite mechanical vibrations, for example.

In an embodiment, a control system may be provided that may interface with the equipment at a wellbore servicing location. The control system may interface with the equipment previously mentioned such as blender, pumps, and manifolds, as well as equipment such as sand belts, proppant storage units, flow meters, pressure transducers, and other equipment well known in the art in use at wellbore servicing locations. The control system may perform the methods discussed above to vary the equipment operating conditions to generate data points and enter the data points into an operational database to generate a model of the equipment at the wellbore servicing location. The control system may be configured to use the model to determine operating parameters that minimize horsepower required to pump a particular pump schedule, for example. Minimizing horsepower may have many benefits including reducing fuel usage and thereby reducing emissions.

The systems and methods may include any of the various features of the systems and methods disclosed herein, including one or more of the following statements.

Statement 1. A method of fracturing including: varying a plurality of operational parameters of wellbore servicing equipment; observing a response of the wellbore servicing equipment; generating a model of the wellbore servicing equipment based on the response; and changing at least one of the plurality of operational parameters based at least in part on the model.

Statement 2. The method of statement 1 wherein the step of varying the plurality of operational parameters includes varying at least one of output pressure or flow rate of pumps.

Statement 3. The method of any of statements 1-2 wherein the wellbore servicing equipment includes a plurality of pumps connected to a first side of a manifold and a plurality of pumps connected to a second side of the manifold and wherein varying the plurality of operational parameters includes increasing at least one of pressure or flow rate of at least one pump on the first side of the manifold while decreasing at least one of pressure or flow rate of at least one pump on the second side of the manifold.

Statement 4. The method of statements 1-3 wherein the step of varying operational parameters does not change a rate of wellbore treatment more than about 10%.

Statement 5. The method of statements 1-4 wherein the plurality of operational parameters includes RPM, rate, pressure, density, or a combination thereof.

Statement 6. The method of statements 1-5 wherein the wellbore servicing equipment includes blenders, pumps, discharge lines, manifolds, and combinations thereof.

Statement 7. The method of statements 1-6 wherein the response includes a response to ambient temperature change, oil temperature change, transmission fluid temperature change, fluid density change, fluid rate change, fluid pressure change, or a combination thereof.

Statement 8. The method of statements 1-7 wherein the step of observing the response includes observing a temperature dependent response of pump horsepower.

Statement 9. The method of statements 1-8 wherein the step of observing the response includes observing a rate dependent response on cavitation.

Statement 10. The method of statements 1-9 wherein the step of observing the response includes observing a rate dependent response on beat frequencies.

Statement 11. The method of statements 1-10 wherein the step of observing the response includes observing a rate dependent response on mechanical resonances.

Statement 12. The method of statements 1-11 further comprising recording the response in an operational database.

Statement 13. The method of statements 1-12 wherein the model includes a predictive correlation between at least one of ambient temperature and horsepower output of a pump, flow rate and pump cavitation, flow rate and beat frequencies, flow rate and mechanical resonance, flow rate and flow pulsation, or combinations thereof.

Statement 14. The method of statements 1-13 wherein the step of changing at least one of the plurality of operational parameters based at least in part on the model includes changing at least one operational parameter such that a fuel consumption of the wellbore servicing equipment is reduced while maintaining a rate of wellbore treatment.

Statement 15. A system comprising: wellbore servicing equipment fluidically coupled to a wellbore; a control system operable to adjust operational parameters of the wellbore servicing equipment and collect operational data about the wellbore servicing equipment; an operational database comprising historical data points of operational parameters and operational data of the wellbore servicing equipment, the operational database being accessible by the control system; and a model, the model being based at least in part on the historical data points of operational parameters and operational data of the wellbore servicing equipment.

Statement 16. The system of statement 15 wherein the control system is configured to adjust operational parameters of the wellbore servicing equipment and record the collected operational data in the operational database.

Statement 17. The system of any of statements 15-16 wherein the wellbore servicing equipment includes a plurality of pumps connected to a first side of a manifold and a plurality of pumps connected to a second side of the manifold and wherein the control system is configured to: increase at least one of pressure or flow rate of at least one pump on the first side of the manifold while decreasing at least one of pressure or flow rate of at least one pump on the second side of the manifold; measure operational data related to the increasing at least one of pressure or flow rate of at least one pump and decreasing at least one of pressure or flow rate of at least one pump; and record the collected operational data in the operational database.

Statement 18. The system of any of statements 15-17 wherein the control system is configured to adjust operational parameters of the wellbore servicing equipment based at least in part on the model.

Statement 19. The system any of statements 15-18 wherein the control system is configured to adjust operational parameters of the wellbore servicing equipment such that a horsepower requirement for a flow rate of treatment fluid is decreased.

Statement 20. The system of any of statements 15-19 wherein the control system is configured to adjust operational parameters of the wellbore servicing equipment such that emissions for a flow rate of treatment fluid is decreased.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in the present disclosure and one or more patent(s) or other documents that may be incorporated herein by reference, the definitions that are consistent with the present disclosure should be adopted.

What is claimed is:

1. A method of fracturing comprising:
   pumping a wellbore treatment fluid into a subterranean formation using wellbore servicing equipment comprising a plurality of pumps;
   varying a plurality of operational parameters of the wellbore servicing equipment;
   observing a response of the wellbore servicing equipment;
   generating a model of the plurality of pumps based on the response;
   changing a horsepower output of two or more of the plurality of pumps based at least in part on the model to form an updated plurality of operational parameters such that a rate of wellbore treatment does not change more than about 10%;

pumping the wellbore treatment fluid into the subterranean formation using the wellbore servicing equipment wherein the wellbore servicing equipment is operated at the updated plurality of operational parameters; and
   updating the updated plurality of operational parameters of the wellbore servicing equipment based at least in part on the model, such that the plurality of pumps are operated such that mechanical vibrations are avoided wherein the model is utilized to predict oscillation frequencies in manifold and discharge lines and the operational parameter of the wellbore servicing equipment is changed to reduce the oscillation frequencies in manifold and discharge lines.

2. The method of claim 1 wherein the step of varying the plurality of operational parameters comprises varying at least one of output pressure or flow rate of pumps.

3. The method of claim 1 wherein the plurality of pumps are connected to a first side of a manifold and a second side of the manifold and wherein varying the plurality of operational parameters comprises increasing at least one of pressure or flow rate of at least one pump on the first side of the manifold while decreasing at least one of pressure or flow rate of at least one pump on the second side of the manifold.

4. The method of claim 1 wherein the plurality of operational parameters comprise RPM, rate, pressure, density, or a combination thereof.

5. The method of claim 1 wherein the wellbore servicing equipment comprises at least one of blenders, pumps, discharge lines, manifolds, and combinations thereof.

6. The method of claim 1 wherein the response comprises a response to ambient temperature change, oil temperature change, transmission fluid temperature change, fluid density change, fluid rate change, fluid pressure change, or a combination thereof.

7. The method of claim 1 wherein the step of observing the response comprises observing a temperature dependent response of pump horsepower.

8. The method of claim 1 wherein the step of observing the response comprises observing a rate dependent response on cavitation.

9. The method of claim 1 wherein the step of observing the response comprises observing a rate dependent response on beat frequencies.

10. The method of claim 1 wherein the step of observing the response comprises observing a rate dependent response on mechanical resonances.

11. The method of claim 1 further comprising recording the response in an operational database.

12. The method of claim 1 wherein the model comprises at least one predictive correlation between at least one of ambient temperature and horsepower output of a pump, flow rate and pump cavitation, flow rate and beat frequencies, flow rate and mechanical resonance, flow rate and flow pulsation, or combinations thereof.

13. The method of claim 1 wherein the step of changing at least one of the plurality of operational parameters based at least in part on the model comprises changing at least one operational parameter such that a fuel consumption of the wellbore servicing equipment is reduced while maintaining the rate of wellbore treatment.

14. The method of claim 1 wherein the wellbore servicing equipment is fluidically coupled to a common manifold and a blender.

15. The method in claim 1 wherein response is stored in an operational database operatively associated with the model, and wherein the model predicts flow behavior of the one or more of the plurality of pumps, and wherein flow behavior is utilized to change the horsepower output of the two or more of the plurality of pumps.

16. The method of claim 1 wherein varying the plurality of operational parameters of the wellbore servicing equipment comprises varying a density of the wellbore treatment fluid by changing an amount of proppant in the wellbore treatment fluid.

17. A method of fracturing comprising:

pumping a wellbore treatment fluid into a subterranean formation using wellbore servicing equipment comprising a plurality of pumps;

varying a plurality of operational parameters of the wellbore servicing equipment;

observing a response of the wellbore servicing equipment;

generating a model of the plurality of pumps based on the response;

changing a horsepower output of two or more of the plurality of pumps based at least in part on the model to form an updated plurality of operational parameters such that a rate of wellbore treatment does not change more than about 10%; and pumping the wellbore treatment fluid into the subterranean formation using the wellbore servicing equipment wherein the wellbore servicing equipment is operated at the updated plurality of operational parameters, wherein the model is utilized to predict the operational parameter where equipment damage, pressure spikes, or both occur, and the operational parameter of the wellbore servicing equipment is changed to reduce equipment damage, pressure spikes, or both.

18. A method of fracturing comprising:

pumping a wellbore treatment fluid into a subterranean formation using wellbore servicing equipment comprising a plurality of pumps;

varying a plurality of operational parameters of the wellbore servicing equipment;

observing a response of the wellbore servicing equipment;

generating a model of the plurality of pumps based on the response;

changing a horsepower output of two or more of the plurality of pumps based at least in part on the model to form an updated plurality of operational parameters such that a rate of wellbore treatment does not change more than about 10%;

pumping the wellbore treatment fluid into the subterranean formation using the wellbore servicing equipment wherein the wellbore servicing equipment is operated at the updated plurality of operational parameters; and determining available rate of a pump in the plurality of pumps using the model and updating a pump schedule based on the determined available rate of the pump and bringing one pump in the plurality of pumps offline and utilizing the model to determine one or more pumps in the plurality of pumps to redistribute rate to such that such that the rate of wellbore treatment does not change more than about 10%.

* * * * *